(12) United States Patent
Frederick et al.

(10) Patent No.: US 7,258,392 B2
(45) Date of Patent: Aug. 21, 2007

(54) AUTOMOTIVE VEHICLE FRONT ARCHITECTURE WITH A PARTIALLY ROTATABLE STRUCTURAL LINK

(75) Inventors: Gregory S. Frederick, Shelby Township, MI (US); Phillip Przybylo, Waxhaw, NC (US); Li Chai, Northville, MI (US); Xiaowei Li, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 11/161,830

(22) Filed: Aug. 18, 2005

(65) Prior Publication Data

US 2007/0040414 A1    Feb. 22, 2007

(51) Int. Cl.
*B62D 25/08* (2006.01)
(52) U.S. Cl. ............................. 296/187.09; 296/203.02
(58) Field of Classification Search ........... 296/187.03, 296/187.09, 203.02
See application file for complete search history.

(56) References Cited

U.S. PATENT DOCUMENTS

| | | | |
|---|---|---|---|
| 4,919,474 A | 4/1990 | Adachi et al. | |
| 5,100,189 A | 3/1992 | Futamata et al. | |
| 6,394,535 B1 * | 5/2002 | Kawamura et al. | .... 296/187.03 |
| 6,598,933 B2 | 7/2003 | Taguchi et al. | |
| 6,695,393 B1 | 2/2004 | Aouadi et al. | |
| 6,729,424 B2 | 5/2004 | Joutaki et al. | |
| 6,854,574 B2 * | 2/2005 | Yoshida et al. | ............. 188/371 |
| 2003/0075377 A1 * | 4/2003 | Roehringer et al. | ........ 180/312 |
| 2003/0107241 A1 | 6/2003 | Ritchie et al. | |

\* cited by examiner

*Primary Examiner*—Dennis H. Pedder
(74) *Attorney, Agent, or Firm*—Gigette M. Bejin; Dickinson Wright PLLC

(57) ABSTRACT

An automotive vehicle front structure includes upper and lower siderails and a structural link extending from the upper and lower siderails, with the structural link having a pivotable connection to the upper siderail and a rigid connection to the lower siderail, such that energy absorption provided by the structure may be tailored by varying the character of the joint between the structural link and the upper siderail.

16 Claims, 5 Drawing Sheets

AUTOMOTIVE VEHICLE FRONT ARCHITECTURE WITH A PARTIALLY ROTATABLE STRUCTURAL LINK

TECHNICAL FIELD

The present invention relates to an automotive vehicle front structure having a rotatable link connecting upper and lower siderails such that the rotatable link helps to control the sequence of energy absorption during a frontal impact on the vehicle.

BACKGROUND

Designers of automotive vehicles have devised a veritable plethora of structures intended to control both dynamic deformation and energy absorption in the event of a frontal impact upon a vehicle. Such structures have, on occasion, used upper and lower frame rails. U.S. Pat. No. 6,695,393, which is assigned to the assignee of the present invention, discloses a vehicular front end structure having upper and lower frame rails connected by a fender apron. U.S. Pat. No. 4,919,474 shows a similar construction in which upper and lower members are connected by a fender apron. The structures of the '393 and '474 patents tie together the upper and lower frame rails before, during, and after an impact. Accordingly, both the upper and lower rails will serve to absorb energy from the beginning of an impact event. This means that the rate of energy absorption cannot be shaped as is possible with the present invention, because the present invention decouples the upper frame rail from the lower frame rail, at least at the onset of an impact event. As a result, the present system provides the ability to, in effect, shape the rate of energy absorption and hence, axial deformation of the front of the vehicle.

SUMMARY

An automotive vehicle front structure includes a bumper beam, a lower siderail attached to and extending rearwardly from the bumper beam, and an upper siderail extending rearwardly from a location behind the bumper beam. The structure further includes a structural link extending from the lower siderail to the upper siderail, with the structural link having a first end pivotably mounted to the upper siderail and a second end attached to the lower siderail. The second end of the structural link is rigidly attached to the lower siderail, and the first end of the structural link is mounted to the leading edge of the upper siderail. The pivotal mounting of the structural link to the upper siderail is arranged such that an impact directed against the bumper beam or the structural link itself having sufficient force to cause axial deformation of the lower siderail will initially cause the second end of the structural link to deform while the first end of the structural link pivots freely with respect to the upper siderail. Further axial deformation of the lower siderail will cause additional deformation of the second end of the structural link and further pivoting of the first end of the structural link with respect to the upper siderail until the structural link reaches a position at which pivoting of the first end of the structural link with respect to the upper siderail is inhibited.

Once rotation of the structural link is inhibited, further axial deformation of the lower siderail will cause the structural link to deform the upper siderail. This means that the upper siderail will then participate in the energy absorption function of the front structure by deforming the upper siderail both in bending and in crushing. In other words, the upper siderail will be moved both by bending and translationally according to column loading mechanics.

The upper and lower siderails are generally parallel and horizontal when a vehicle equipped with the present structure is sitting on a horizontal roadway. A structural link member preferably extends generally vertically from the lower siderail to the upper siderail. Another structural member included in the present invention is a front cross member extending laterally across the vehicle and being attached to the lower siderail behind the bumper. Those skilled in the art will appreciate due to this disclosure that although only a driver's side structure is shown, the present invention will, most often be employed with both the left and right sides of the vehicle.

The structural link connecting the upper and lower siderails will deform at its terminus with the lower siderail and rotate rearwardly upon an upper pivotable mount as the lower siderail deforms until a rotational limiter prevents further rotation of the structural link. This rotational limiter preferably comprises an abutment interposed between the structural link and upper siderail such that further rotation of the structural link will be prevented in the event that the abutment is in contact with both the structural link and the upper siderail.

According to another aspect of the present invention, a method for reacting to an axial impact load applied to a vehicle front structure having upper and lower parallel siderails connected with a semi-pivoted structural link includes the steps of axially deforming the lower siderail while simultaneously deforming a lower end of the structural link attached to the lower siderail and rotating a pivoted upper end of the structural link with respect to the upper siderail, followed by continuing to deform the lower siderail, while deforming the lower end of the structural link and rotating the upper end of the structural link until a rotational stop interposed between the structural link and the upper siderail is encountered by the structural link and, finally, deforming the upper siderail by forces applied by the structural link and the lower siderail to the upper siderail once the rotational stop has been encountered and further axial deformation of the lower siderail occurs. In this manner, the forces applied by the structural link to the upper siderail will include translational and rotational forces.

It is an advantage of a system according to the present invention that the absorption of energy in the event of a frontal impact of a vehicle may be more carefully controlled because the initial energy absorption arises through the use of lower siderails, whereas the upper siderails of the structure remain decoupled from the impact event during an initial period of the impact.

It is another advantage of a system according to the present invention that the amount of crush resulting from a frontal impact may be adjusted by the designer of the vehicle by changing the point at which rotation of the structural link connecting the upper and lower siderails becomes constrained.

Other advantages, as well as features and objects of the present invention, will become apparent to the reader of this specification.

DETAILED DESCRIPTION OF THE PREFERRED EMBODIMENTS

Figure 1:
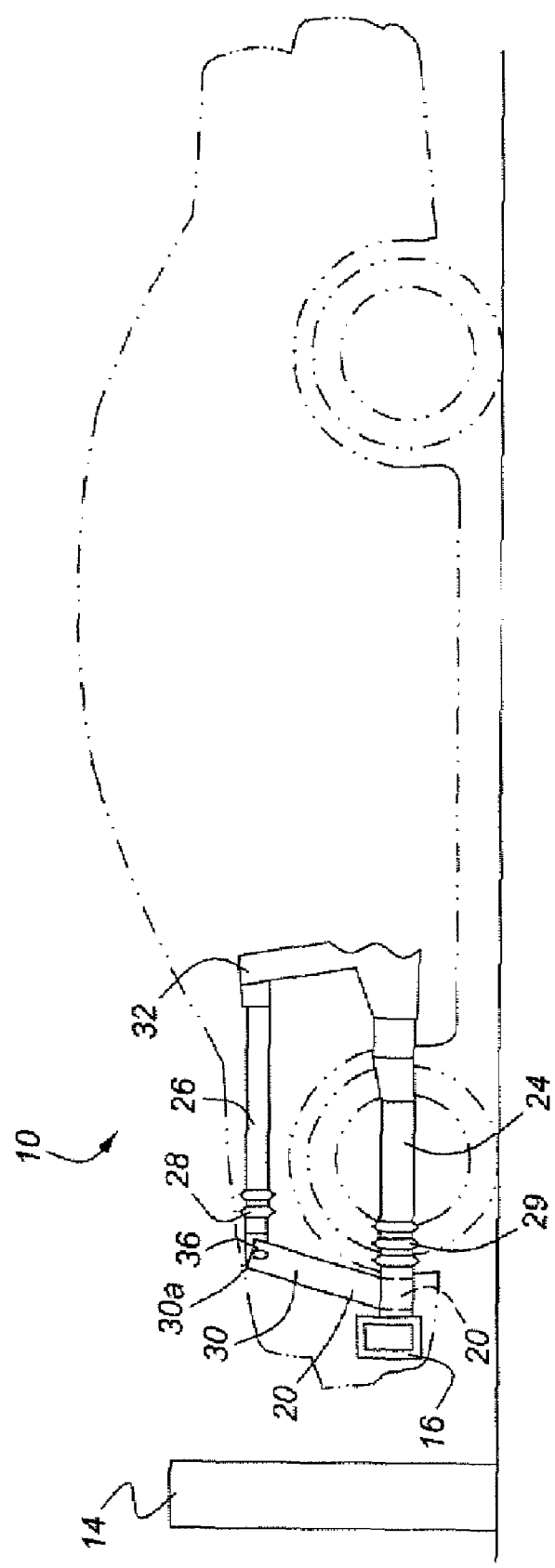
FIG. 1 is a side view of a vehicle having a front architecture according to the present invention.

In the following figures the same reference numerals will be used to illustrate the same components.

FIG. 1 shows vehicle 10 in the state prior to any frontal impact. Lower siderail 24 is shown as having at least one crushable trigger, 29, therein, which allows controlled axial deformation of rail 24. Upper siderail 26, which is generally parallel to lower siderail 24 and separated vertically from lower siderail 24, also has a crush trigger, 28, incorporated therein. Crush triggers 28 and 29 are conventional, stamped sections allowing axial compression to occur in a controlled manner. These triggers may be selected from any number of trigger designs known to those skilled in the art and suggested by this disclosure.

Figure 5:
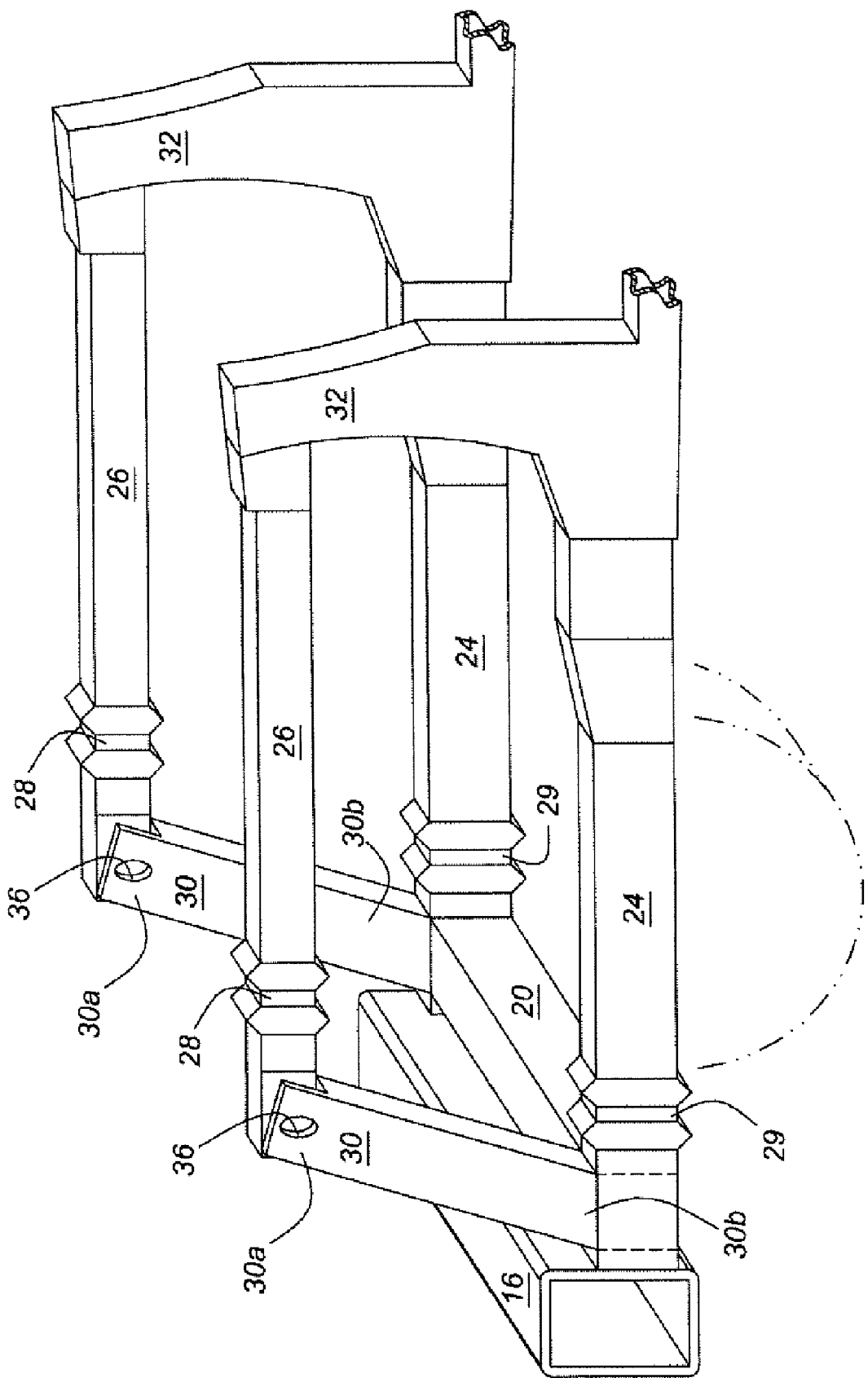
FIG. 5 is a perspective view of a front frame portion of the vehicle illustrated in FIG. 1.

Upper siderail 26 and lower siderail 24 both extend rearwardly in the direction of dash panel 32. Although upper siderail 26 is shown as extending rearwardly from a location behind bumper beam 16, those skilled in the art will appreciate in view of this disclosure that this offset may be minimized as it is only necessary that upper siderail 26 be positioned so to allow packaging of various components, such as the radiator support, within the vehicle. FIG. 5 shows duplicate left and right upper and lower siderails and structural link members according to the present invention.

Structural link 30 has first end 30a, which is pivotably attached to upper control arm 26 by means of fastener 40 (shown only in FIG. 4), which passes through an elliptical aperture 36 formed in first end 30a of structural link 30. Elliptical aperture 36 allows structural link 32 to both pivot upon fastener 40, and to move translationally to a limited extent, with respect to fastener 40 and upper siderail 26.

Figure 2:
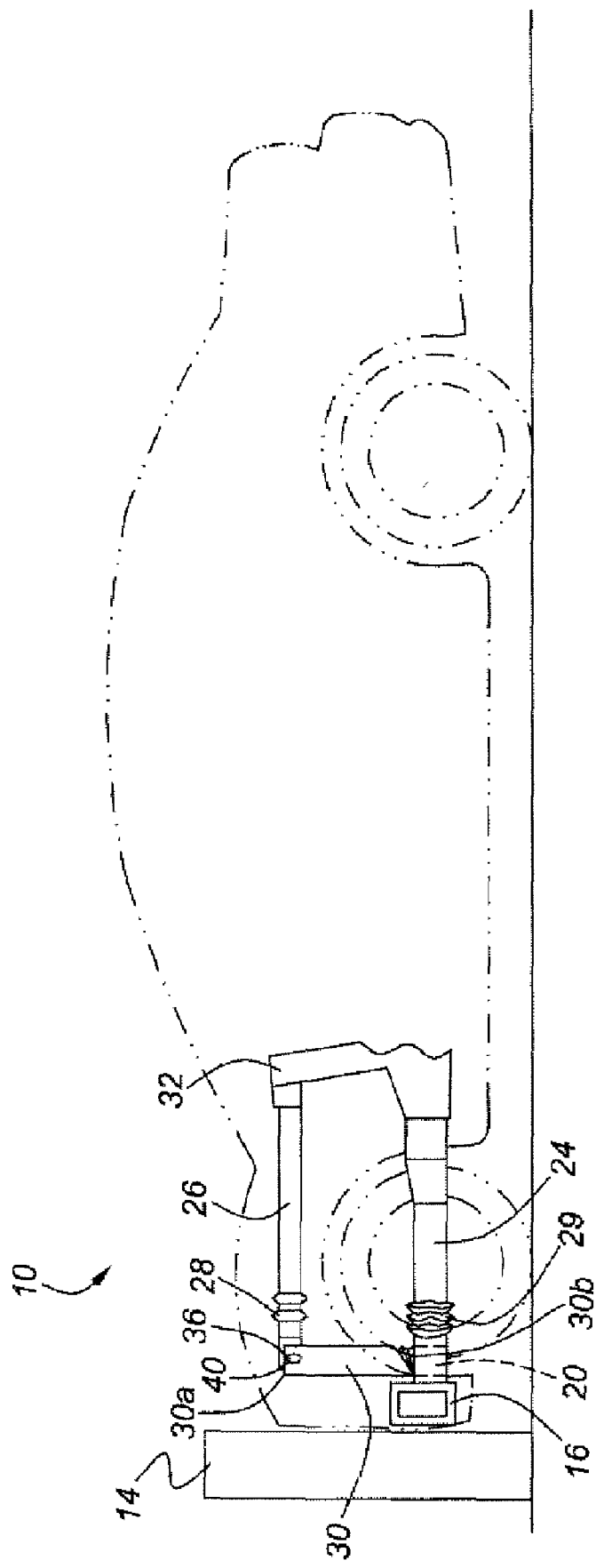
FIG. 2 shows an initial response of the present structure to a frontal impact.

FIG. 2 shows vehicle 10 as having undergone an initial amount of front end deformation after impacting barrier 14. As shown in FIG. 2, structural link 30 has rotated about the axis of fastener 40 to a point at which structural link 30 is roughly perpendicular to both upper siderail 26 and lower siderail 24. At the point shown in FIG. 2, upper siderail 26 has not been deformed. In other words, upper siderail 26 has had no effect on the absorption of energy or crush distance characterizing impact of vehicle 10 into barrier 14. Note, however, that second end 30b, which is the lower end of structural link 30, has been plastically deformed from the as-installed condition shown in FIG. 1, because structural link 30 is now perpendicular to lower siderail 24. Also, crush trigger 29 has started to deform and collapse axially, in response to the axial load imposed upon lower siderail 24.

Figure 3:
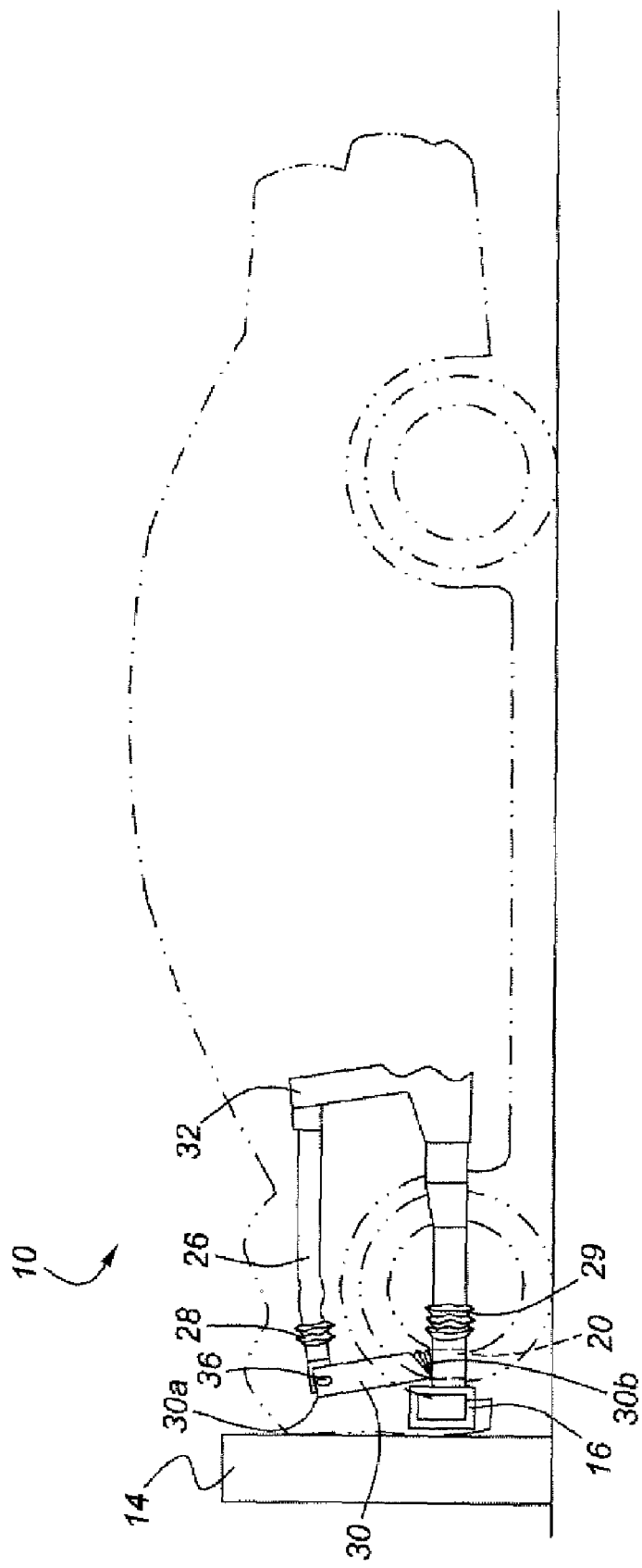
FIG. 3 shows a more advanced response of the present structure to a frontal impact in which the rotational link has deformed the upper siderail.
Figure 4:
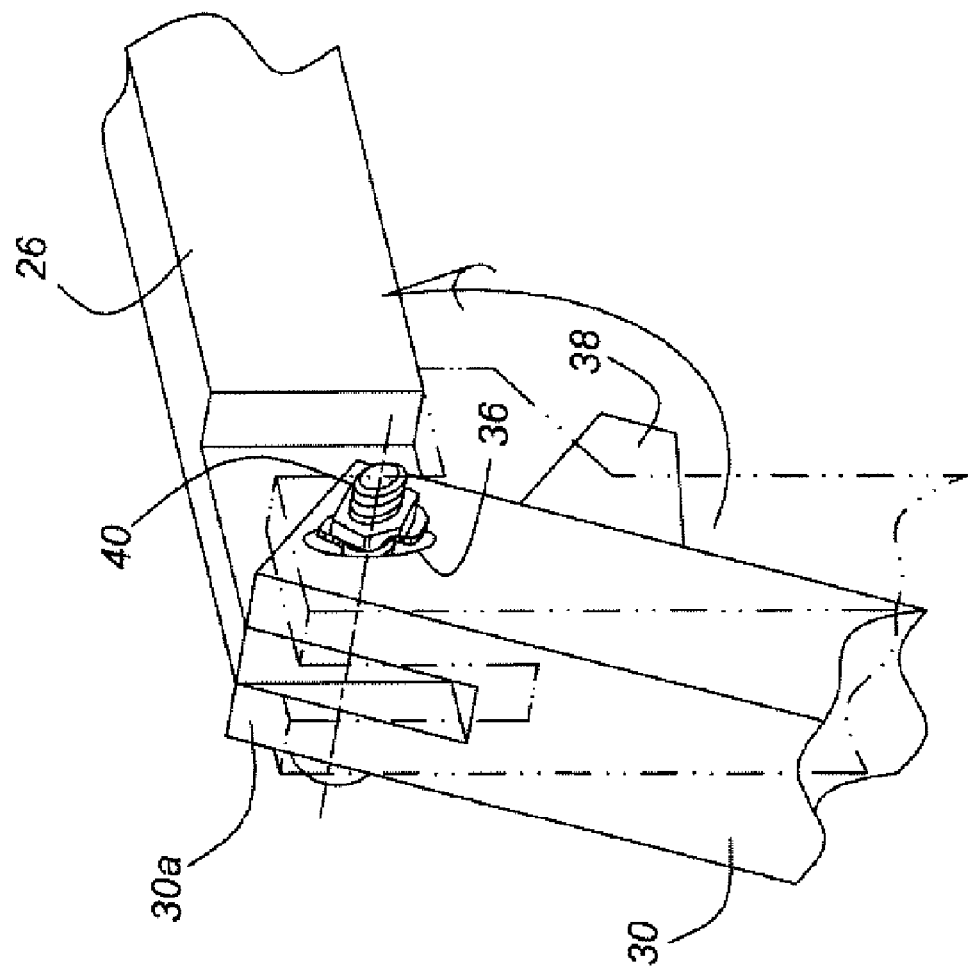
FIG. 4 illustrates certain details of the connection between a structural link attaching the lower and upper siderails and the upper siderail itself.

FIG. 4 shows a rotational limiter feature which is built in to structural link 30 and upper siderail 26. In essence, abutment 38 is interposed between structural link 30 and upper siderail 26 such that when upper siderail 26 reaches the position shown in FIG. 2, further rotation of structural link 30 with respect to upper siderail 26 will be prevented. As a result, further axial deformation of lower siderail 24 will cause the situation shown in FIG. 3, wherein structural link 30 deforms upper siderail 26 both in bending and axially. In essence, structural link 30 will apply both rotational bending forces and axially directed crushing forces to upper siderail 26. In this manner, the upper siderail 26 will begin to absorb energy only after a controlled amount of crushing and axial deformation of lower siderail 24 has occurred. This allows the rate of energy absorption as a function of the axial deformation of the vehicle front structure to be adjusted to accommodate the needs of any particular vehicle, as affected by the vehicle architecture, weight, type of powertrain, etc. When the vehicle has deformed to the level shown in FIG. 3, second end 30b of structural link 30 has also deformed more, so that structural link 30 may now tip forward rather than rearward as shown in FIG. 1.

It should be clear from the foregoing explanation that structural link 30 is only partially rotatable because second end 30b of link 30 is welded to lower siderail 24 and thus, that part of link 30 cannot rotate with respect to lower siderail 24. Moreover, first end 30a of structural link 30 is allowed to rotate only until a rotational limiter, such as abutment 38, prevents further rotation of the structural link.

While particular embodiments of the invention have been shown and described, numerous variations and alternate embodiments will occur to those skilled in the art. Accordingly, it is intended that the invention be limited only in terms of the appended claims.

What is claimed is:

1. An automotive vehicle front structure, comprising:
   a bumper beam;
   a lower siderail attached to and extending rearwardly from said bumper beam;
   an upper siderail extending rearwardly from a location behind said bumper beam; and
   a structural link extending from said lower siderail to said upper siderail, with said structural link having a first end pivotably mounted to said upper siderail and a second end attached to said lower siderail.

2. An automotive vehicle according to claim 1, wherein the second end of said structural link is rigidly attached to said lower siderail and the first end of the structural link is mounted to the leading end of said upper siderail.

3. An automotive vehicle according to claim 1, wherein said pivotal mounting of said structural link to said upper siderail is arranged such that an impact directed against either said bumper beam, or said structural link, with sufficient force to cause axial deformation of the lower siderail will initially cause the second end of the structural link to deform, while the first end of the structural link pivots freely with respect to the upper siderail.

4. An automotive vehicle according to claim 3, wherein further axial deformation of the lower siderail will cause additional deformation of the second end of the structural link and further pivoting of the first end of the structural link with respect to said upper siderail until the structural link reaches a position at which pivoting of the first end of the structural link with respect to the upper siderail is inhibited.

5. An automotive vehicle according to claim 4, wherein axial deformation of said lower siderail beyond the point at which pivoting of the structural link is inhibited will cause the structural link to deform the upper siderail.

6. An automotive vehicle according to claim 1, wherein said upper siderail is generally parallel to said lower siderail.

7. An automotive vehicle according to claim 1, wherein said upper siderail and lower siderail are generally horizontal.

8. An automotive vehicle according to claim 1, wherein said structural link extends generally vertically from the lower siderail to the upper siderail.

9. An automotive vehicle according to claim 1, further comprising a front cross member extending laterally across the vehicle and being attached to said lower siderail behind said bumper.

10. An automotive vehicle according to claim 1, further comprising a first crush trigger incorporated in said upper siderail, and a second crush trigger incorporated in said lower siderail.

11. An automotive vehicle front structure, comprising:
   a bumper beam;
   a front cross member located behind said bumper beam;
   a generally horizontal lower siderail attached to and extending rearwardly from said bumper beam and said front cross member;
   a generally horizontal upper siderail extending rearwardly from a location behind said bumper beam and separated vertically from said lower siderail; and
   a structural link extending generally vertically from said lower siderail to said upper siderail, with said structural link having a first end pivotably mounted to said upper siderail and a second end rigidly attached to said lower siderail such that an impact directed axially against the vehicle front structure will cause the structural link to deform and rotate rearwardly upon said pivotable mount as the lower siderail deforms, until a rotational limiter prevents further rotation of the structural link, with further axial deformation of the lower siderail causing the structural link to deform the upper siderail.

12. An automotive vehicle front structure according to claim 11, wherein said rotational limiter comprises an abutment interposed between said structural link and said upper siderail such that further rotation of the structural link will be prevented in the event that the abutment is in contact with both the structural link and the upper siderail.

13. An automotive vehicle front structure according to claim 11, wherein said structural link is pivoted to said upper siderail so as to allow both rotational and translational movement of the structural link with respect to the upper siderail.

14. A method for reacting to an axial impact load applied to a vehicle front structure having upper and lower parallel siderails connected with a semi-pivoted structural link, comprising the steps of:
   axially deforming the lower siderail, while simultaneously deforming a lower end of the structural link attached to the lower siderail and rotating a pivoted upper end of the structural link with respect to the upper siderail;
   continuing to deform the lower siderail, while deforming the lower end of the structural link and rotating the upper end of the structural link until a rotational stop interposed between the structural link and the upper siderail is encountered by the structural link; and
   deforming the upper siderail by forces applied by the structural link and the lower siderail to the upper siderail once the rotational stop has been encountered and further axial deformation of the lower siderail occurs.

15. A method according to claim 14, wherein said forces applied by the structural link to the upper siderail comprise translational and rotational forces.

16. A method according to claim 14, further comprising the step of allowing the upper end of the structural link to move to a limited extent translationally with respect to the upper siderail.

* * * * *